United States Patent
LeComte

[11] 3,735,110
[45] May 22, 1973

[54] DIGITAL SINE/COSINE GENERATOR
[75] Inventor: Corstiaan LeComte, Hiizen, Netherlands
[73] Assignee: N.V. Hollandse Signaalapparaten, Hengelo, Netherlands
[22] Filed: Oct. 14, 1971
[21] Appl. No.: 189,211

[30] Foreign Application Priority Data
Oct. 19, 1970  Netherlands ..................... 7015266

[52] U.S. Cl. .................... 235/197, 235/152, 235/186
[51] Int. Cl. ........................... G06f 15/34, G06g 7/22
[58] Field of Search ...................... 235/197, 150.53, 235/152, 186, 189; 307/229; 328/14, 142

[56] References Cited
UNITED STATES PATENTS

| | | | |
|---|---|---|---|
| 3,529,138 | 9/1970 | Andre et al. | 235/197 X |
| 3,569,684 | 3/1971 | Burnett | 235/152 |
| 3,596,076 | 7/1971 | Zimmerman | 235/197 |
| 3,624,636 | 11/1971 | Diederich | 235/197 X |

Primary Examiner—Joseph F. Ruggiero
Attorney—Frank R. Trifari

[57] ABSTRACT

In a sine/cosine generator the angular value written into an angle register, is directly supplied to a memory (ROM), if either the sine of an angle located in the first or third quadrant, or the cosine of an angle in the second or fourth quadrant must be determined. The value is supplied in inverted form to the memory, if either the sine of an angle located in the second or fourth quadrant, or the cosine of an angle located in the first or third quadrant must be determined. The memory contains the sine values of a discrete number of angular values to be offered by the angle register. Furthermore, the sine/cosine generator comprises various logic circuits to minimize the memory capacity to be used, and to place the sine and cosine values, obtained by the memory and provided with a sign bit, in a register which is part of an output circuit.

9 Claims, 5 Drawing Figures

INVENTOR

CORSTIAAN LE COMTE

AGENT

DIGITAL SINE/COSINE GENERATOR

The invention relates to a digital sine/cosine generator provided with an angle register, and a memory containing in digital form, the sine values of a discrete number of angular values to be offered by said register.

Digital sine/cosine generators which make use of read-only memories (ROM's), i.e. memories containing fixed values of definite magnitudes, are known. In such known sine/cosine generators, both a sine and a cosine value are available in the memory for each angular value offered by the angle register. If, for example, the angular value is offered in $m$ bits, $2^m$ sine and cosine values correspond with them; if each trigonometrical value is expressed in $k$ bits, the memory should have a total capacity of $(2)2^m(k)$ bits. In view of the fact that each use of memory capacity is expensive, it is advantageous to minimize this use without reducing, however, the accuracy of the desired (trigonometrical) values.

It is therefore the object of the invention to provide such an embodiment of the sine/cosine generator, wherein the memory capacity can be used to greater advantage while retaining the same accuracy. According to the invention, the digital sine/cosine generator contains for this purpose a control unit, to which are supplied in the first instance, the contents of that part of the angle register in which the two most significant bits are stored, and to which in the second instance, signals are supplied indicating whether the sine or the cosine of the angular value contained in said register should be determined. The control unit ensures that the contents of the angle register decreased by the two most significant bits, are supplied directly to the memory by use of switching means, when either the sine of an angle located in the first or third quadrant, or the cosine of an angle in the second or fourth quadrant must be determined. These contents are supplied in inverted form to said memory, or when either the sine of an angle located in the second or fourth quadrant, or the cosine of an angle located in the first or third quadrant must be determined. The sine/cosine generator further comprises an output circuit which comprises a register which is controlled by a signal supplied by the control unit. A sine value is placed therein together with a sign bit supplied by the memory, corresponding to said sine or cosine value, respectively.

Such an embodiment makes it possible, if the angular value is offered in $m$ bits and the desired trigonometrical value is expressed in $k$ bits, to limit the total required memory capacity at any rate to $2^{m-2}(k)$ bits. Splitting-up of the memory into two part memories makes it possible, in conjunction with a favorable design of the output circuit, to limit the required memory capacity to $2^{m-4}(k+6)$ bits.

The invention and its advantages will now be further explained with reference to the figures, of which:

FIG. 3 shows in detail a possible embodiment of the digital sine/cosine generator, while

Like parts in the figures are denoted by like numerals.

Figure 1:
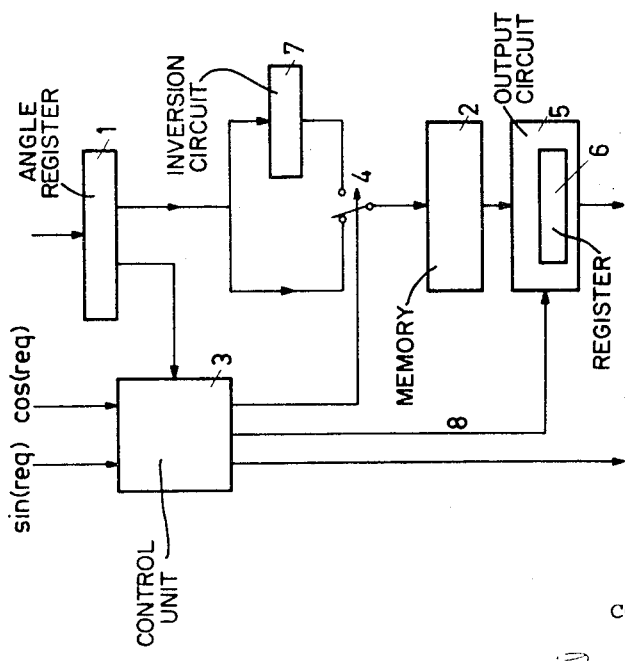
FIG. 1 shows a block diagram of the digital sine/cosine generator according to the invention.

In the block diagram of the digital sine/cosine generator shown in FIG. 1 the angle register is denoted by 1 and the memory by 2. The choice of the number of bits in which the angular value is offered to the memory is determined by the accuracy required with respect to the angular value offered. In the embodiment under consideration 13 bits have been chosen, the most significant of which is the 180° bit and the least significant the $\delta$-bit with $\delta = 180° (2^{116\ 12}) \cong 0.8$ mils.

The memory 2 now contains in digital form the sine values of a discrete number of angular values to be offered by register 1; these sine values are expressed in the embodiment here considered in 10 bits of which the most significant corresponds to sin 30° = ½ and the least significant corresponds to $2^{-10}$.

According to the invention the digital sine/cosine generator comprises a control unit 3. In the first instance, it is fed with the contents of that part of the angle register, which contains the two most significant bits, the 180° and 90° bits, and in the second instance it is supplied with signals which indicate whether the sine or the cosine of the angular value contained in register 1 should be determined. The latter signals have been denoted by sin(req) or cos(req). According to the invention, control unit 3 ensures, using switching means available for this purpose, that the contents of angle register 1 decreased by the two most significant bits are fed direct to memory 2, if either the sine of an angle located in the first or third quadrant, or the cosine located in an angle in the second or fourth quadrant should be determined. These bits are fed in inverted form to said memory if either the sine of an angle located in the second or fourth quadrant or the cosine of an angle located in the first or third quadrant should be determined. According to the invention, the sine/cosine generator further comprises an output circuit 5 which comprises at least a register 6 containing a sine value. This memory provides this value together with a sign bit, which corresponds to a desired sine or cosine value. The memory is under the control of a signal supplied by the control unit.

As the 180° and the 90° bit are fed to control unit 3, the angle register 1 can only offer angular values to the memory smaller than 90°. The angular values which are or are not supplied directly to the memory can be represented in magnitude by $o, \delta, 2\delta, 3\delta, \ldots, 90° - \delta$. In so far as an angle $\phi$ is located in the first quadrant, the whole angular value written in register 1 is offered to the memory. However, if an angle $\phi$ is located in the second quadrant the memory is only offered an angular value $\phi - 90°$. It also holds, that if an angle $\phi$ is located in the third or fourth quadrant, an angular value $\phi - 180°$ or $\phi - 270°$, is offered to the memory.

If the sine of an angle $\phi$ located in the first quadrant should be determined, the angular value as a whole, expressed in 11 bits, is offered directly to the memory. The memory then directly supplies the value of sin $\phi$, expressed in 10 bits.

If the cosine of an angle $\phi$ located in the first quadrant should be determined, the angular value 90° $- \phi$ should be offered to the memory; for only then, the memory supplies the value $\sin(90° - \phi) = \cos \phi$. The angular value 90° $- \phi$ is obtained from the angular value by inversion of the latter angular value. As an example the diagram below shows the inversion of an angle $\phi = 30°$.

|  | 180° bit | 90° bit | 45° bit |  | 26 bit | 6 bit |
|---|---|---|---|---|---|---|
| Contents of angle register (30°). | 0 | 0 | 0 | 1 0 1 0 1 0 1 0 | 1 | 0 |
| Offered to the memory after inversion (60°) |  | 1 | 0 1 0 1 0 1 0 1 | 0 | 1 |

The inversion is performed by means of the inversion circuit denoted by 7 in FIG. 1. This inversion circuit consists of 11 inverters (one for each bit). It will, however, be clear that the angle register can be designed in such a way that the elements constituting this register may supply an output signal both in the "normal" and in the "inverted" form. In such a case the inverters are already included in the angle register.

If the sine of an angle $\phi$ located in the second quadrant should be determined, the angular value $\phi - 90°$ must be offered to the memory in inverted form; consequently, the angular value $90° - (\phi - 90°) = 180° - \phi$ is offered. The memory then supplies the value $\sin(180° - \phi) = \sin \phi$.

If the cosine of an angle $\phi$ located in the second quadrant should be determined, the angular value $\phi - 90°$ is offered direct to the memory. The memory then supplies the value $\sin(\phi - 90°) = -\cos \phi$. When this value is placed in register 6, the $-\cos \phi$ value is provided with the correct sign by means of a signal supplied by control unit 3 via line 8.

If the sine of an angle $\phi$ located in the third quadrant should be determined, the angular value $\phi - 180°$ is offered directly to the memory. This memory then supplies the value $\sin(\phi - 180°) = -\sin \phi$. This value is provided with the correct sign when it is placed in register 6.

If the cosine of an angle $\phi$ located in the third quadrant should be determined, the angular value $\phi - 180°$ is offered to the memory in an inverted form; thus the following value is offered: $90° - (\phi - 180°) = 270° - \phi$. The memory then supplies the value $\sin(270° - \phi) = -\cos \phi$. This value is provided with the correct sign when it is placed in register 6.

If the sine of an angle $\phi$ located in the fourth quadrant should be determined, the angular value $\phi - 270°$ should be offered to the memory in an inverted form; thus the following value is offered: $90° - (\phi - 270°) = 360° - \phi$. Then the memory supplies $\sin(360° - \phi) = -\sin \phi$. This value is provided with the correct sign when it is placed in register 6.

If the cosine of an angle $\phi$ located in the fourth quadrant should be determined, the angular value $\phi - 270°$ is offered directly to the memory. The memory then supplies the value $\sin(\phi - 270°) = \cos \phi$.

Summarizing it may be said, that the angular value available in register 1 minus the 90° and 180° bits, is fed direct to the memory, if the sine of an angle located in the first or third quadrant should be determined or the cosine of an angle located in the second or fourth quadrant. The condition for this direct transfer can be expressed as follows:

$$(\overline{180°} \times \overline{90°} + 180° \times \overline{90°}) \sin + (\overline{180°} \times 90° + 180° \times 90°) \cos$$

or after simplification by:

$$(\overline{90°}) \sin + (90°) \cos$$

In these expressions 90° or 180°, respectively, indicate that the 90° bit or the 180° bit, respectively, is "high" and $\overline{90°}$ or $\overline{180°}$, indicate respectively, that the 90° bit or the 180° bit is "low". The sin or cos, respectively, indicate that the signals sin(req), or cos(req) are available.

It may further be said that the angular value available in register 1 minus the 90° and the 180° bits is offered in an inverted form to the memory, if the sine of an angle located in the second or fourth quadrant should be determined, or the cosine of an angle is located in the first or third quadrant. The condition for this transfer in an inverted form may be expressed as follows:

$$(\overline{180°} \times 90° + 180° \times \overline{90°}) \sin + (\overline{180°} \times \overline{90°} + 180° \times 90°) \cos$$

or after simplification by:

$$(90°) \sin + (\overline{90°}) \cos.$$

The signals representing the two derived conditions are generated in control unit 3 and function as control signals for the switching means 4.

If the above inversion process is considered more closely, an angular value $\phi$ after inversion does not appear to give the angular value $90° - \phi$, but the value $90° - \phi - \delta$. Therefore, an error corresponding with the least significant bit of the angular value offered is introduced. If, for example, the $\phi = 22.5°$ value is stored in the angle register and if the sine and the cosine of this angular value are successively desired, the memory will supply the sin 22.5° value or $\cos(22.5° + \delta)$ value, respectively. The error here described can be corrected by storing in the memory not the sine values of $0, \delta, 2\delta, \ldots, 90° - \delta$, but the sine values of $\frac{1}{2}\delta, 3/2\delta, \ldots, 90° - \frac{1}{2}\delta$. If now, successively, the sine or cosine of angular value $\phi = 22.5°$ is desired, the memory supplies the values $\sin(22.5° + \frac{1}{2}\delta)$ or $\cos(22.5° + \frac{1}{2}\delta)$, respectively. It may be noted that $\sin \frac{1}{2}\delta$ is indicated by 00000.00000 and $\cos \frac{1}{2}\delta$ by 11111.11111. By applying the above artifice, the correct complement of an angular value offered has been obtained by a single inversion.

Figure 2:
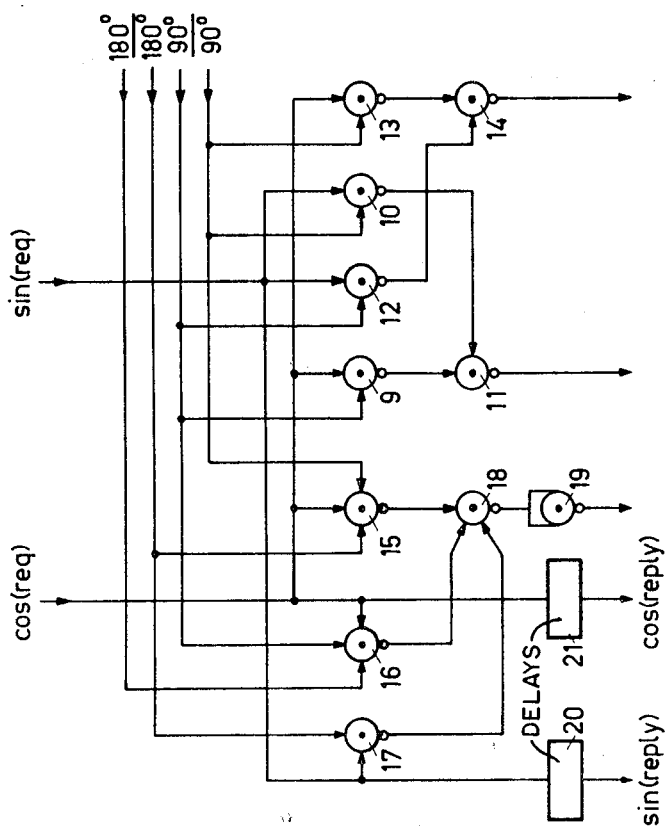
FIG. 2 shows an embodiment of the control unit.

FIG. 2 shows a possible embodiment of control unit 3. In this unit the two signals are generated which function as control signals for the switching means 4 denoted in FIG. 1. As mentioned before, these control signals represent the following conditions:

$$(\overline{90°}) \sin + (90°) \cos$$

and $(90°) \sin + (\overline{90°}) \cos.$

The first condition is realized by means of the NAND elements 9, 10 and 11 which elements have been connected in the way indicated in FIG. 2. After having been fed with signals 90°, $\overline{90°}$, sin(req) and cos(req), all of the NAND elements 9, 10 and 11 supply a signal indicating that an angular value offered by the angle register should be supplied directly to the memory.

The second condition is realized by means of the NAND elements 12, 13 and 14 which have been connected as shown in FIG. 2. After having been supplied with signals 90°, $\overline{90°}$, sin(req) and cos(req), all of the NAND elements 12, 13 and 14 give a signal indicating that the angular value offered by the angle register should be fed to the memory only after inversion.

Further, in control unit 3, a signal is generated which is fed as control signal to the output circuit. This control signal represents the condition:

$\overline{180°} \times \sin +$ $(90° \times 180° + \overline{90°} \times \overline{180°}) \cos.$ This condition is realized by means of the NAND elements 15, 16, 17, 18 and 19 which have been connected as shown in FIG. 2. After having been supplied with signals 90°, $\overline{90°}$, 180°, $\overline{180°}$, sin(reg) and cos(req), all of the NAND elements 15 through 19 give a signal by means of which the desired sine or cosine is provided with the correct sign. Said control signal is "low", if the sine or cosine is positive and "high" if the sine or cosine is negative. Finally, control unit 3 comprises two delay circuits 20 and 21 to which signals sin(req) or cos(req), respectively, are fed, and whose output signals identify the trigonometrical value supplied by the output circuit as being the sine or cosine of the angular value written in register 1. These two signals are denoted by sin(reply) or cos(reply).

Figure 3:
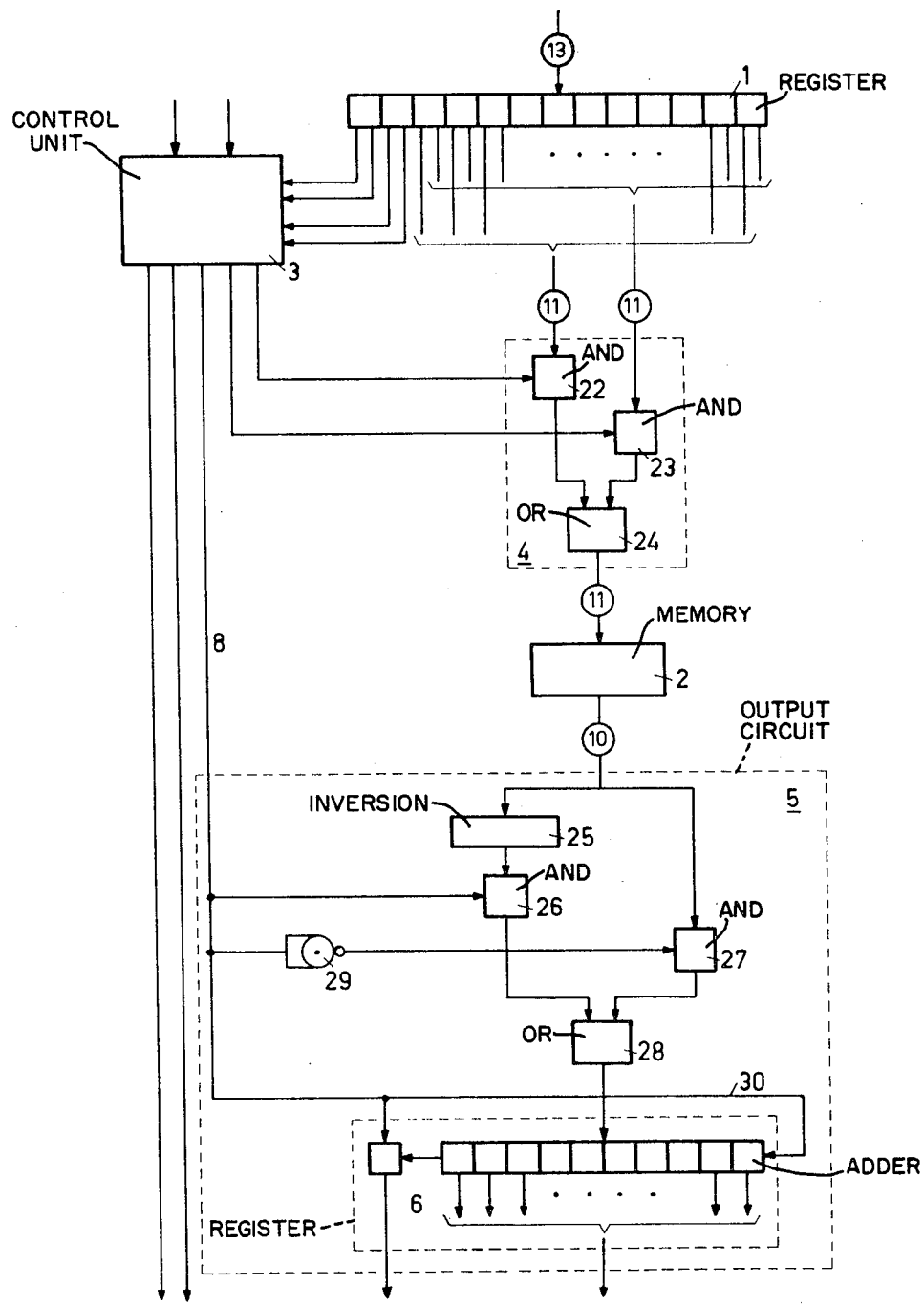

FIG. 3 shows a possible embodiment of the digital sine/cosine generator in detail.

The switching means 4 consist here of two multiple AND gates 22 and 23, respectively, and a multiple OR gate 24. The contents of the angle register 1 decreased by the 90° and the 180° bit, are fed directly to the memory via multiple AND gate 22 and multiple OR gate 24, if condition $(\overline{90°}) \sin +(90°) \cos$ has been met. On the other hand the contents of the angle register decreased by the two most significant bits are fed, via multiple AND gate 23 and multiple OR gate 24 in inverted form to the memory, if condition $(90°) \sin +(\overline{90°}) \cos$ has been met. It may be noted that the angle register is built up of bistable elements and can supply, therefore, both the angular value and the inverted angular value.

In the embodiment shown in FIG. 3 register 6 is constituted by a parallel adder of which the number of elements correspond to the number of bits of which the trigonometrical value supplied by the memory is composed, and increased by a sign bit. Apart from the register 6 already mentioned, output circuit 5 comprises a circuit in which the trigonometrical values coming from the memory are expressed in the two's complement system. This circuit is constituted by inversion circuit 25, multiple AND gates 26 and 27, multiple OR gate 28 and NAND element 29.

The trigonometrical value coming from the memory is written into register 6 via multiple AND gate 27 and multiple OR gate 28, if via the NAND element 29, the signal derived from the control unit 3 indicates that the said trigonometrical value is positive. This enables multiple AND gate 27.

On the other hand, the trigonometrical value coming from the memory is written into register 6 after inversion, via multiple AND gate 26 and multiple OR gate 28, if the signal coming from control unit 3 indicating that the trigonometrical value desired is negative, enables multiple AND gate 26.

The signal already mentioned coming from control unit 3 and indicating whether the trigonometrical value desired is positive or negative is written into the 11th element of register 6. If the value desired is positive a 0 is written in, if it is negative a 1 is written in.

A difficulty may arise, if a certain trigonometrical value assumes the 0 value, for example, sin 180°. In this case the memory supplies the sin ½δ value, in binary notation 00000.00000. This sine is considered negative by the control unit, so that in register 6, the inverse of the sin ½ value is written in binary notation: 1.11111.11111, of which the most significant bit indicates the sign. However, sin 180° should assume the value 0 and in the two's complement system, this can only be done by 0.00000.00000. The value written into register 6 is, therefore, increased by 0.00000.00001, in case the required trigonometrical value is negative. For this purpose the signal coming from the control unit indicating whether the desired trigonometrical value is positive or negative is fed via line 30 to the least significant element of register 6.

If by way of example, sin(30°), or sin(210°), respectively, is asked for, the 30° value is offered to the memory in both cases, and therefore, the memory supplies the sin(30° + ½δ) in binary notation: 1.00000.00000. If the sin(30°) value (a positive sine value) is asked for, the 0.10000.00000 value is written into register 6. If, on the other hand, the sin(210°) value (a negative sine value) is asked for, the value 1.01111.11111 is written into register 6 and 0.00000.00001 is added to it, so that the sin(210°) in binary notation is denoted by 1.10000.00000. It also appears that, apart from the sign, the sin(30°) and sin(210°) values are each others two's complement, for 10000.00000 increased by 10000.00000 gives 1.00000.00000.

Figure 4:
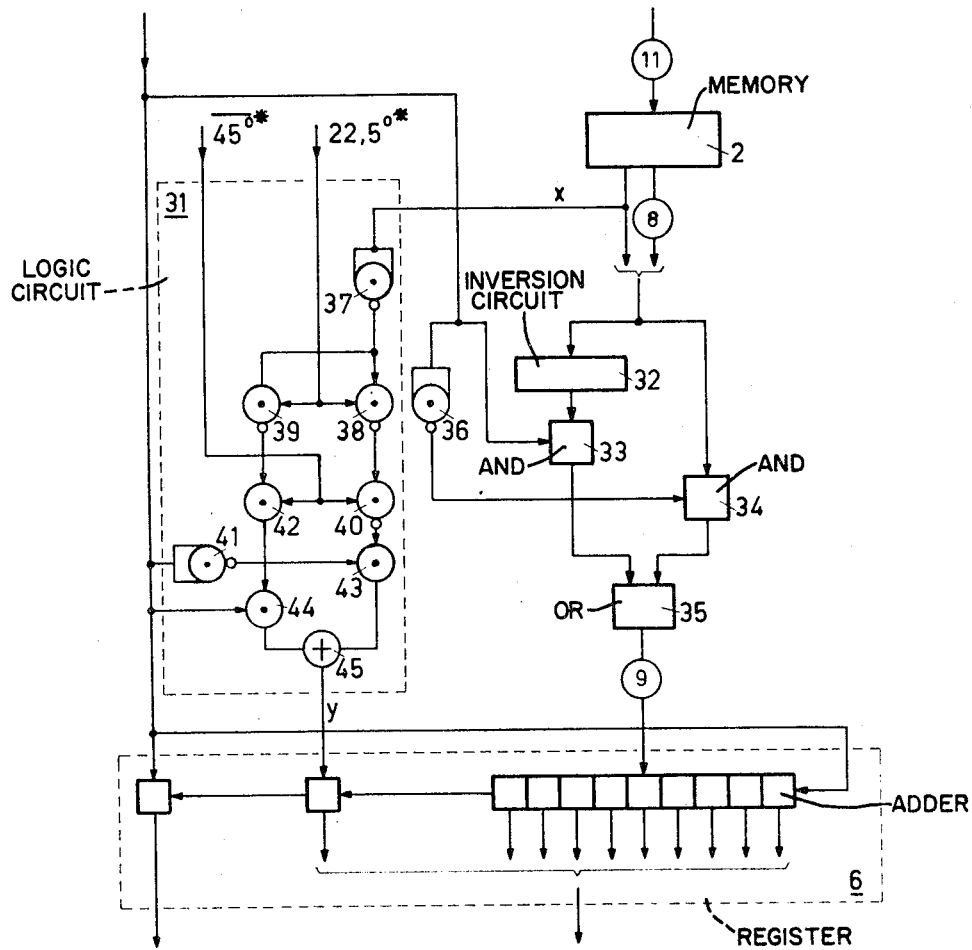
FIGS. 4 and 5 show two embodiments of the output circuit in conjunction with the memories used.

FIG. 4 shows a modified detailed version of output circuit 5 in conjunction with the memory 2. In this memory the sine values, are calculated in 10 bits, but only the nine least significant bits are really stored in the memory. In other words, the most significant bit of a desired trigonometrical value is not determined by the memory. The consequence of this procedure, is a decrease of the usable memory capacity. In the embodiment shown in FIG. 3 it was $2^{11} \times 10$, but in the embodiment described here the memory capacity has been decreased to $2^{11} \times 9$.

For the purpose of determining the most significant bit of a trigonometrical value desired, the output circuit 5 is provided with a logic circuit 31. Similar to the output circuit 5 of FIG. 3, the output circuit of FIG. 4, further comprises the register 6 designed as a parallel adder, the inversion circuit 32, the multiple AND gates 33 and 34, the multiple OR gate 35 and the NAND element 36.

The value coming from the memory as expressed in nine bits, is written into the first elements of register 6. This is accomplished identically to the manner described with reference to FIG. 3, via multiple AND gate 34 and multiple OR gate 35. If accomplished via NAND element 36, the signal coming from the control unit indicates that the desired trigonometrical value is positive, and enables multiple AND gate 34. On the other hand, the value derived from the memory after inversion is written into the first nine elements of register 6 via multiple AND gate 33 and multiple OR gate 35, if the signal coming from the control unit indicates that the desired trigonometrical value is negative.

Circuit 31 is used to determine the contents of the 10th element of register 6. For this purpose, the circuit is built up of NAND elements 37 to 41, AND gates 42, 43 and 44 and OR gate 45. These elements and gates are connected as shown in FIG. 4.

The following signals are fed to circuit 31:
the signal $45° \times (90° \times \sin + 90° \times \cos) + 45° \times (90° \times \sin + + \overline{90°} \times \cos)$, derived from the angle register. This signal which represents the $\overline{45°}$ bit at the input of the memory, is the abbreviated destination: $\overline{45°*}$;

the signal 22.5°×(90°×sin +90°×cos) + + 22.5°× (90°×sin + 90°×cos), also derived from the angle register. This signal which represents the 22.5° bit at the input of the memory is abbreviated by: 22.5°*;

the most significant bit of the values supplied by the memory 2; this signal is represented by: $x$ (= ½ of the weight of the said 10th bit).

If the desired trigonometrical value is positive, the signal represented by OR gate 45 is $$\overline{y=(x)22.5°*\,(45°)*} = (x)22.5°* + 45°*.$$

This condition implies that if the angular value offered to the memory is $\phi < 22.5°$, $y$ assumes the valve 0 irrespective of $x$. If $\phi \geq 45°$, $y$ assumes the 1 value again irrespective of $x$. For the case that $22.5° \leq \phi < 45°$ the above condition is simplified to $y = \overline{x}$. Now we should distinguish between $22.5° \leq \phi < 30°$ and $30° \leq \phi < 45°$. In the former case, the value of the most significant bit of the value supplied by memory 2 is 1 in the latter case 0; the value for $y$ is 0 then or 1, respectively. Summarizing it can be said that the contents of the 10th bit of register 6 in case $\phi < 30°$ are indicated by $y = 0$, and if $30° \leq \phi$ by $y = 1$.

If the desired trigonometrical value is negative, the signal indicated by OR gate 45 is represented by:

$$y = \overline{(\overline{x})22.5°*\,(45°)*} = \overline{(\overline{x})22.5°*} + 45°*.$$

This condition implies that if the angular value offered to the memory is $\phi < 22.5°$, $y$ assumes the value 1 irrespective of $x$. If $\phi \geq 45°$, $y$ assumes the value 0 again irrespective of $x$. For the case that $22.5° \leq \phi < 45°$ the above condition is simplified to $y = x$. Now we should distinguish between $22.5° \leq \phi < 30°$ and $30° \leq \phi < 45°$. In the former case, the value of the most significant bit of the value supplied by memory 2 is 0, in the latter case, 1. In that case $y$ is 1 or 0, respectively. Summarizing it can be said that the contents of the 10th bit of register 6 in case $\phi < 30°$ are indicated by $y = 1$ and if $30° \leq \phi$ by $y = 0$.

By way of example we consider again sin(30°) or sin(210°), respectively. In both cases the angular value offered to the memory in binary notion is:

01010101010.

The $\overline{45°}$ and $\overline{22.5°}$ signals supplied to logic circuit 31 are both 1. In case sin(30°) should be determined, the condition represented by circuit 31 is simplified to $y = x$, and in case sin(210°) should be determined, to $y = x$. Although in the original determination of the memory contents, the value sin(30° + ½δ) is expressed in binary notion by: 10000.00000, the value 0000.00000 is available in the memory, and is consequently readout. This shows that $x = 0$, so that $y = 1$ in determining sin(30°), and $y = 0$, in determining sin(210°). If the sin(30°) value is desired the value:

| 0 | 1 | 0000.00000 |
|---|---|---|
| (sign bit) | (10th bit) | | is written into register 6.
If on the other hand, the sin(210°) value is desired, the valve

| 1 | 0 | 1111.11111 |
|---|---|---|
| (sign bit) | (10th bit) | | is written into the register.

In similar fashion as that shown in FIG. 3, 0.00000.00001 should be added for negative trigonometric values to the contents of register 6, in the embodiment shown in FIG. 4. Consequently, sin(210°) is represented by:

| 1 | 1 | 0000.00000. |
|---|---|---|
| (sign bit) | (10th bit) | |

Figure 5:
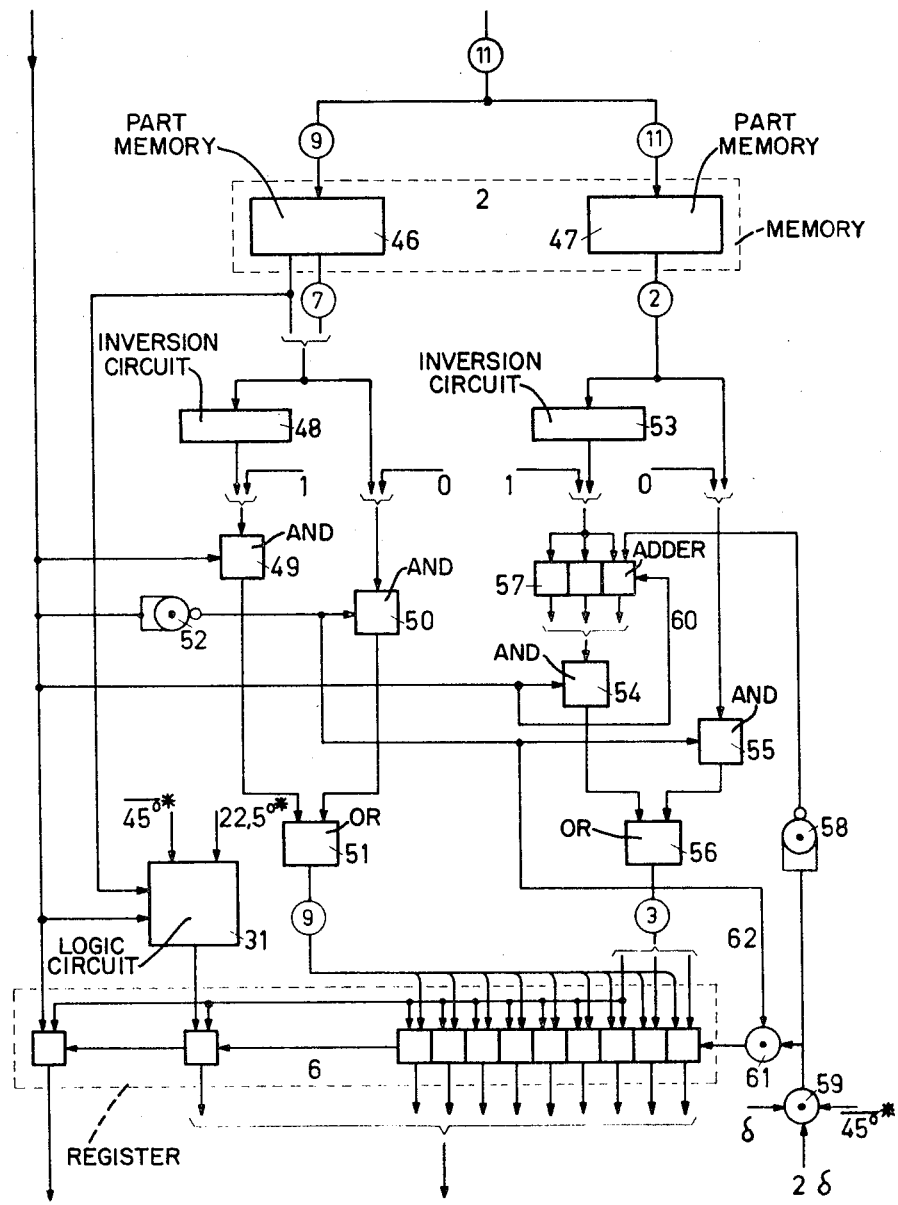

FIG. 5, shows a second detailed embodiment of the output circuit used in conjunction with memory 2.

The memory 2, consists of a first part memory 46, and a second part memory 47. Of the angular value offered to the memory by the angle register, the 9 most significant bits are fed to the part memory 46, namely the 45° bit, 22.5° bit, . . . , 4δ bit. This part memory contains the $2^9$ sine values which can be expressed in magnitude by: sin ½δ , sin (9/2δ , sin (17/2) δ, etc. Although the trigonometrical values desired must be expressed in 10 bits, they are calculated in nine bits for the sake of storing them in part memory 46. The part memory 46 supplies the "coarse" sine values. Of these sine values originally calculated in nine bits, only eight bits are actually stored in the part memory. Analogous to the description with reference to FIG. 4, the most significant bit of the trigonometrical value desired is not determined by the memory here but by logic circuit 31. The memory capacity used by part memory 46 can be indicated now by $2^9 \times 8$ bits. The whole angular value offered to the memory by the angle register is fed to part memory 47. This part memory contains $2^{11}$ sine increment values expressed in two bits, which serve to correct the coarse sine values determined by means of part memory 46. The memory capacity used by part memory 47 can be indicated by $2^{11} \times 2$ bits. The total capacity of memory 2 is now decreased, with respect to the embodiment shown in FIG. 4, to $2^9 \times 8 + 2^{11} \times 2 = 2^{13}$ bits.

Like the embodiments shown in FIGS. 3 and 4, the register 6 is constituted by a parallel adder. Further, the output circuit comprises two circuits in which the values derived from the two part memories expressed in the two's complement system, can be written into register 6.

The first of the two circuits in which the values supplies by part memory 46 are written into register 6, is constituted by inversion circuit 48, multiple AND gates 49 and 50, multiple OR gate 51 and NAND element 52.

In case the trigonometrical value desired is positive, the multiple AND gate 50 is enabled using the NAND element 52, and the value expressed in eight bits by part memory 46 is placed into the second to the ninth element of register 6 via multiple AND gate 50 and multiple OR gate 51. In the first element of this register, a 0 is written. For this purpose, a ninth bit is added to the eight bits derived from the part memory. The ninth bit is also fed to register 6 via multiple AND gate 50 and multiple OR gate 51.

In case the trigonometrical value desired is negative, the multiple AND gate 49 is enabled, and the value expressed in eight bits by part memory 46, is placed into the second to the ninth element of register 6, only after inversion in circuit 48 via multiple AND gate 49 and multiple OR gate 51. In the first element of this register a 1 is written. For this purpose the ninth bit is added to the eight bits in the part memory. This is also fed to register 6 via multiple AND gate 49 and multiple OR gate 51.

As already noted, the contents of the 10th element of register 6 are determined by logic circuit 31 to which (in a way identical to FIG. 4), the $\overline{45°}$, and the 22.5° signals are fed. Also fed thereto, is the most significant bit of the value supplied by part memory 46 and the previously mentioned signal derived from the control unit.

The "coarse" trigonometrical value written in the above described way into register 6 is corrected by a sine increment value available in part memory 47. Part memory 46 contains $2^9 = 512$ coarse sine values; part memory 47 contains $2^{11} = 2048$ sine increment values. Expressed in binary notion, they assume one of the values 00, 01, 10 or 11. Since the 00 value does not entail any correction, a maximum of three corrected (fine) sine values can be obtained between two successive coarse sine values.

Apart from the first circuit already mentioned, for placing the values derived from part memory 46 into register 6, the output circuit also contains a second circuit to add the value supplied by part memory 47 to the value (derived from part memory 46) already available in register 6. This is accomplished in such a way that the desired trigonometrical values are expressed in the two's complement system. This second circuit comprises for this purpose an inversion circuit 53, multiple AND gates 54 and 55, multiple OR gate 56 and a parallel adder 57 consisting of three elements.

In case the trigonometrical value desired is positive, the multiple AND gate 55 is enabled using the NAND element 52 already mentioned, and the value expressed in bits by part memory 47 is placed into the 1st and 2nd element of register 6 via multiple AND gate 55 and multiple OR gate 56. A 0 is added to the 3rd up to the 11th element of said register; for this purpose a third bit is added to the two derived from the part memory. The third bit is also fed to register 6 via multiple AND gate 55 and multiple OR gate 56.

In case the trigonometrical value desired is negative, the multiple AND gate 54 is enabled. However, not only the inverted value of the value derived from part memory 47 is fed to register 6 via this gate, but this value is also placed into the first and second element of a parallel adder 57. A third bit is added to the value derived from part memory 47, which assumes the constant value 1. This bit is placed in the third element of the parallel adder 57. In the present case, in which the trigonometrical value desired is negative, the contents of the parallel adder are also raised by 1. If the sine increment value supplied by part memory 47 assumes the value 00, 01, 10 and 11, respectively, the contents of the parallel adder 57 can be represented by 000, 111, 110 and 101, respectively. The first two bits of the value contained in the parallel adder 57 are fed to the first and second element of register 6 via multiple AND gate 54 and multiple OR gate 56. The third bit of the value contained in the parallel adder 57 is fed via multiple AND gate 54 and multiple OR gate 57 to the remaining elements of register 6, namely the third to the 11th element. Consequently, the following sine increment value is added to the, coarsely determined, trigonometrical value desired in register 6, in case this trigonometrical value is negative:

0.00000.00000, 1.11111.11110, or 1.11111.11101, in other words: the least significant bit is 0, 1, 2 or 3 times deducted from the coarsely determined trigonometrical value, or the absolute value of the coarsely determined trigonometrical value is raised by the least significant bit 0, 1, 2 or 3 times.

A second correction facility is created by a correction circuit consisting of NAND element 58 and AND gates 59 and 61. The contents of register 6 are raised by 1 by these means, if the condition $\delta \times 2\delta \times \overline{45°}$ is met, and the desired trigonometrical value is negative. The contents of the parallel adder 57 is raised by 1, if the condition: $\overline{\delta \times 2\delta \times 45°*}$ is met. These expressions: $\delta$, $2\delta$ and $\overline{45°}$, represent signals occurring at the input of the memory derived from angle register 1 as aforementioned.

The sine values of successive angular values offered may differ, if these angular values are not too large (for example smaller than 45°). Therefore, the sine increment values supplied by part memory 47 are insufficient to apply the required corrections to the coarsely determined trigonometrical values. The supplied increment values may assume the values 00, 01, 10 or 11. Should the increment value 11 appear to be insufficient, it must be possible to raise it to 100.

In case the desired trigonometrical value is positive, the above mentioned second correction is made if the angular value offered to the memory is $\phi$  45°, and further, $\delta = 1$ and $2\delta = 1$. This is accomplished by raising the contents of register 6 by 1 using AND gates 59 and 61. It should be noted, that AND gate 61 is enabled by a signal supplied via line 62 indicating that the desired trigonometrical value is positive.

In case the desired trigonometrical value is negative, the above mentioned second correction is carried out by the omission of a raise by 1 of the parallel adder 57. If $\phi > 45°$ or $\phi \leq 45°$, provided $\delta$ and/or $2\delta \neq 1$, the contents of the parallel adder are raised by 1. This action results in a correction to the coarsely determined trigonometrical value of +1, 0, −1 or −2 times the least significant bit.

If, for example, sin(210°) is desired, 010101010 is offered to part memory 46 and 01010.10101.0 is offered to part memory 47. Part memory 46 supplies 0000.0000, and part memory 47 supplies 00. The coarsely determined trigonometrical value in register 6 is then represented by:

| 1 | 0 | 1 1 1 1 . 1 1 1 1 | 1 |
|---|---|---|---|
| (sign bit) | (10th bit) | (of part memory 46) | (added bit) |

If the part memory supplies 00 as a sine increment value the following: +1 times the least significant bit, should be supplied to register 6 as correction, thus: 0 0 0000.00001. The desired sin(210°) is consequently denoted by: 1.10000.00000. This result corresponds to the result found with reference to FIGS. 3 and 4.

What we claim is:

1. A digital sine/cosine generator, comprising an angle register and a memory which contains in digital form the sine values of a discrete number of angular values to be offered by said register, a control unit to which, in the first instance, are fed the contents of that part of the angle register in which two most significant bits are stored, and to which, in the second instance, signals are supplied indicating whether the sine or the cosine of the angular value contained in said register should be determined, said control unit having switching means for ensuring that the contents of the angle register decreased by the two most significant bits are fed directly to the memory, if either the sine of an angle located in the first or third quadrant, or the cosine of an angle located in the second or fourth quadrant must be determined, said contents being fed in an inverted form to said memory if either the sine of an angle located in the second or fourth quadrant, or the cosine of an angle located in the first or third quadrant should be determined, and an output circuit having at least a register in which, under the control of a signal supplied by said control unit, provides a sine value supplied by said memory, with a sign bit corresponding with said sine or cosine value, respectively.

2. A digital sine/cosine generator according to claim 1, wherein the memory contains $2^{m-2}$ sine values the magnitude of which can be denoted by $\sin(n-1/2)\delta$ with $n = 1, 2, \ldots, 2^{m-2}$, where $m$ represents the number of bits from which the total contents of the angle register are composed, and $\delta$ represents the angular value of the least significant bit.

3. A digital sine/cosine generator according to claim 1, wherein the register in the output circuit comprises a parallel adder, said adder having a number of elements corresponding to a number of bits composed by the sine values supplied by the memory said elements increased by a sign bit, and wherein the signal coming from the control unit and supplied to the output circuit ensures that a sine value supplied by the memory is directly supplied to said adder, if said sine or cosine value is positive, said value being supplied in an inverted form, if said sine or cosine is negative, whereby the above signal derived from the control unit is also supplied to the parallel adder in order to increase the contents of the adder by 1.

4. A digital sine/cosine generator according to claim 2, wherein of each of the sine values expressed in $k$ bits only $k-1$ least significant bits are stored in the memory.

5. A digital sine/cosine generator according to claim 4, wherein the register in the output circuit is formed by a parallel adder consisting of k+1 elements, said generator comprising switching means for feeding the signal coming from the control unit to the output circuit, said switching means ensuring that the number supplied by the memory, and consisting of $k-1$ bits, is directly fed to the first $k-1$ elements of the adder, if said sine or cosine, respectively, is positive, and wherein said number is supplied in an inverted form, if said sine or cosine, respectively, is negative, said sine/cosine generator further comprising a logic circuit for determining the contents of the kth element of the parallel adder after the most significant bit supplied by the memory has been supplied to it, and wherein a signal coming from the control unit, functioning as a sign bit, determines the contents of the ($k+1$)th element of the parallel adder and is fed to said adder in order to increase the contents of said adder by 1 in case the desired sine or cosine, respectively, is negative.

6. A digital sine/cosine generator according to claim 1, wherein the memory comprises a first and a second part memory whereby the first part memory contains $2^{m-4}$ sine values whose magnitude can be denoted by $\sin(4n - 7/2)\delta$ with $n = 1, 2, \ldots, 2^{m-4}$, where $m$ represent the number of bits constituting the total contents of the angle register, and $\delta$ the angular value of the least significant bit, and whereby of each coarse sine value expressed in $k-1$ bits, only the $k-2$ least significant bits are stored in the first part memory, and further wherein sine increment values, $2^{m-2}$, are contained in the second part memory and are expressed in 2 bits form as a refinement of the coarse sine values.

7. A digital sine/cosine generator according to claim 6, wherein the register contained in the output circuit is constituted by a parallel adder consisting of $k+1$ elements, whereby under the control of a signal supplied by the control unit, a coarse sine value supplied by the first part memory is placed into the second to the ($k-1$)th element of the adder, and a sine increment value supplied by the second part memory is fed to the first two elements of the adder and is added to the coarse sine value, the sine/cosine generator further comprising a logic circuit by means of which, after the most significant bit supplied by the first part memory and controlled by signals coming from the angle register and control unit has been supplied to it, the contents of the kth element of the parallel adder are determined, and further wherein the signal coming from the control unit functions as a sign bit for determining the contents of the ($k+1$)th element of the adder.

8. A digital sine/cosine generator according to claim 7, wherein the signal coming from the control unit, using first switching means available for this purpose in the output circuit, ensures that the number consisting of $k-2$ bits supplied by the first part memory is fed directly to the parallel adder if the desired sine or cosine, respectively, is positive, and the number is fed in an inverted form if the desired sine or cosine, respectively, is negative, whereby at the same time either a 0 or a 1 is fed to the least significant element of the parallel adder, and added to the contents of said adder depending on whether the desired sine or cosine, respectively, is positive or negative.

9. A digital sine/cosine generator according to claim 7 wherein the signal coming from the control unit ensures, using second switching means available for this purpose in the output circuit, that the two bits supplied by the second part memory are directly fed to the parallel adder if said sine or cosine, respectively, is positive, and said bits are fed in an inverted form if said sine or cosine, respectively, is negative, and further wherein a correction circuit is available, which for the purpose of sine or cosine determination of small angular values corrects the increment values supplied by the second part memory.

* * * * *

PO-1050
(5/69)

UNITED STATES PATENT OFFICE
CERTIFICATE OF CORRECTION

Patent No. 3,735,110            Dated May 22, 1973

Inventor(s) CORSTIAAN LeCOMTE

It is certified that error appears in the above-identified patent and that said Letters Patent are hereby corrected as shown below:

Column 2, line 9, "$(2^{116\ 12})$" should read $-- (2^{-12}) --$

Column 5, lines 1-3 "$\overline{180°}$ x sin + (90° x 180° + $\overline{90°}$ x $\overline{180°}$) cos"

should read $-- \overline{\overline{180°}}$ x sin + (90° x 180° + $\overline{90°}$ x $\overline{180°}$) cos$--$ Column 6, lines 64-65, "45° x (90° x sin + 90° x cos) +

45° x (90° x sin + 90° x cos)"

should read $--\overline{45°}$ x ($\overline{90°}$ x sin + 90° x cos) +

45° x (90° x sin + $\overline{90°}$ x cos)$--$

Column 7, lines 1-2, "22.5° x (90° x sin + 90° x cos) +

22.5° x (90° x sin + 90° x cos)"

should read $--$22.5° x ($\overline{90°}$ x sin + 90° x cos) +

22.5° x (90° x sin + $\overline{90°}$ x cos)$--$

Column 7, line 12, "y = $\overline{(\bar{x})22.5°^*}$ $(45°^*)$ = $(x)22.5°^* + 45°^*$"

should read $--$y = $\overline{\overline{(\bar{x})22.5°^*}}$ $\overline{(45°^*)}$ = $(\bar{x})22.5°^* + 45°^* --$ Column 7, line 27, "y = $\overline{(\bar{x})22.5°^*}$ $\overline{(45°^*)}$ = $\overline{(\bar{x})22.5°^*}$ $+ \overline{45°^*}$"

should read, $--$y = $\overline{(\bar{x})22.5°^*}$ $\overline{(45°^*)}$ = $\overline{(\bar{x})22.5°^* + 45°^*} --$

PO-1050
(5/69)

UNITED STATES PATENT OFFICE
CERTIFICATE OF CORRECTION

Patent No. 3,735,110            Dated May 22, 1973

Inventor(s) CORSTIAAN LeCOMTE

It is certified that error appears in the above-identified patent and that said Letters Patent are hereby corrected as shown below:

Column 7, line 46, "The $\overline{45^\circ}$ and 22.5°"

should read, --The $\overline{45^{\circ *}}$ and $22.5^{\circ *}$--

Column 7, lines 48-49 "y = x" should read --y = $\overline{x}$--

Column 9, line 5, "$\overline{45^\circ}$, and the 22.5°"

should read, --$\overline{45^{\circ *}}$ and the $22.5^{\circ *}$--

Column 10, line 18, "$\overline{\delta \times 2\delta \times 45^{\circ *}}$"

should read --$\overline{\delta} \times 2 \overline{\delta} \times \overline{45^{\circ *}}$--

Column 10, line 19, "$\overline{45^\circ}$" should read --$\overline{45^{\circ *}}$--

Column 10, line 32, "$\emptyset \quad 45^\circ$" should read --$\emptyset \leq 45^\circ$--

Signed and sealed this 17th day of September 1974

(SEAL)
Attest:

McCOY M. GIBSON JR.                    C. MARSHALL DANN
Attesting Officer                      Commissioner of Paten